United States Patent Office 2,953,748
Patented Sept. 20, 1960

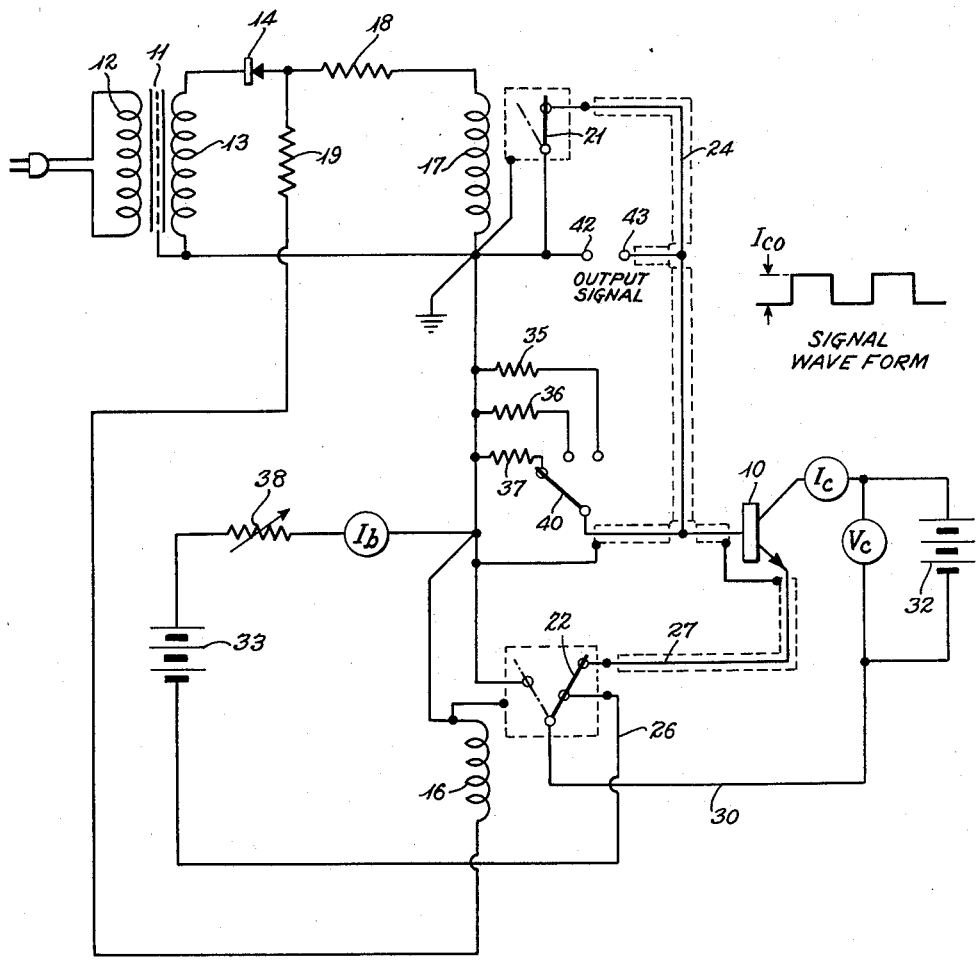

2,953,748

TRANSISTOR TESTING

Jack Lemson and William C. Brower, Dallas, Tex., assignors to Texas Instruments Incorporated, Dallas, Tex., a corporation of Delaware Filed Apr. 15, 1957, Ser. No. 652,910

7 Claims. (Cl. 324—158)

This invention relates to a method and apparatus for testing transistors. Knowledge of the transistor junction temperautre during operation is a valuable aid in transistor design evaluation. According to the present invention, the junction temperature of a transistor can be determined under variable power conditions.

In general, according to the invention, data is taken relating the collector saturation current of the transistor to the temperature with no emitter current, resulting in negligible power input conditions. The collector saturation current with no emitter current shall be termed $I_{c0}$. The transistor is tested by alternately applying power to the transistor and measuring the $I_{c0}$ of the transistor. The junction temperature of the transistor can then be determined from the $I_{c0}$ versus temperature data. In this manner, the junction temperature of the transistor can be studied during power input conditions and therefrom the transistor junction temperature during operation can be predicted.

Prior to the applicant's invention, transistors have been tested by observing or detecting their power amplification characteristics. A common method is to apply a signal to the horizontal plates of an oscilloscope corresponding to the collector current of a transistor and a signal to the vertical plates corresponding to the collector voltage. A saw toothed wave generator is used to excite the transistor being studied. The applicants' invention provides an improved testing technique whereby the actual temperature of the junction in the transistor can be observed under power conditions. The advantages and objects of the applicants' invention can be better understood from the description with reference to the drawing.

The figure discloses the circuit for carrying out the invention.

The circuit in the figure tests a transistor 10 by periodically applying power to the transistor and then measuring the $I_{c0}$ of the transistor in alternate periods. The alternate periods of testing must be of such duration that no significant cooling of the transistor occurs during the times when power to the transistor is shut off for the measurement of the $I_{c0}$ of the unit. This condition is met in the preferred embodiment shown wherein each cycle of testing takes $\frac{1}{60}$ of a second, with each of the two periods of each cycle taking $\frac{1}{120}$ of a second.

The junction temperature of the transistor can be determined by comparing the $I_{c0}$ with data which relates $I_{c0}$ to temperautre under negligible power conditions. In order to obtain the $I_{c0}$ versus temperature data, a D.C. voltage is applied between the base and collector in the proper direction. In the specific example, the transistor tested is an n-p-n transistor and the positive side of the D.C. voltage is conneced to the collector and the negative side is connected to the base. The applied voltage is of sufficient magnitude to cause saturation collector current to flow. The emitter is left unconnected thereby preventing any flow of emitter current. The saturation current then flowing in the collector circuit is the $I_{c0}$. Since the input power is negligible with no emitter current, the junction temperature of the transistor is approximately the same as the ambient temperature. By varying the ambient temperature and allowing the system to come to equilibrium, the temperautre of the junction can be varied. The collector current is then measured for a range of ambient temperatures and recorded to obtain the $I_{c0}$ versus temperature data. Since the $I_{c0}$ varies with the junction temperature, it constitutes a measurement of the temperature. Once the $I_{c0}$ is known, the junction temperature in degrees can be can be ascertained from the $I_{c0}$ versus temperautre data for the unit under test.

The circuit shown in the figure performs the alternate $I_{c0}$ measuring and power applying test. A sixty cycle 110 volt supply is applied to the primary winding 12 of a transformer 11. The secondary winding 13 of the transformer is connected to a rectifier 14 which produces a half wave rectified output. This half wave rectified output is applied respectively to the relay windings 16 and 17 through resistors 19 and 18. The windings 16 and 17 respectively, control the contacts 22 and 21. The contacts 22 and 21 are shown in the positions which they occupy when their exciting windings 16 and 17 are energized. When the winding 17 is de-energized, the contact 21 is disengaged from the lead 24, thus opening the circuit. When the winding 16 is de-energized, the contact 22 disengages the leads 26 and 27 and engages the ground connection. The half wave rectified output energizes and de-energizes the windings 16 and 17 at a rate of 60 cycles per second. As a result, the contacts 21 and 22 are actuated at a rate of 60 cycles per second. Since the windings 16 and 17 are energized from the same source, these contacts 22 and 21 work in synchronism. The contact 21 is engaged with lead 24 at the same time the contact 22 is engaged with leads 26 and 27 and the contact 21 is disengaged at the same time contact 22 engages the ground connection.

The contact 21 is connected to ground and the lead 24 is connected to the base of the transistor 10. The lead 27 is connected to the emitter of the transistor 10 and the lead 30 is connected to the negative terminal of a battery 32, which produces a voltage equal to the D.C. voltage previously used in obtaining the $I_{c0}$ versus temperature data. Of course, the same battery can be conveniently used for both purposes. The positive terminal of the battery 32 is connected to the collector of the transistor 10. The lead 26 is connected to the negative terminal of a low voltage battery 33. The positive terminal of the battery 33 is connected through a variable resistor 38 to ground. A sensitivity switch 40 may be used to connect the base of the transistor to ground through any one of the three resistors 35, 36 and 37, each of which are of a different resistance value. The output signal voltage across the selected resistor is available at the output terminals 42 and 43. The leads connecting the base and the emitter of the transistor under test and the contacts 21 and 22 of the relays respectively are shielded and the shielding is connected to ground.

During the periods of a cycle when the windings 16 and 17 are energized, the contacts 22 and 21 are in the position shown. The base of transistor 10 will be connected to ground over the lead 24 and the contact 21. The emitter of the transistor is made negative with respect to the base by means of the battery 33 and the collector will be biased positively with respect to the emitter by means of the battery 32. The battery 33 provides the emitter current causing a relatively large current to flow in the collector circuit. In this manner, power is applied to the transistor during the period of the cycle when the windings 16 and 17 are energized.

The amount of power applied can be varied by changing the value of the variable resistor 38 and thereby increasing or decreasing the emitter current. An increase in the resistance will decrease the emitter current and thereby decrease the collector current, thus decreasing the applied power. A decrease in the resistance will correspondingly cause an increase of applied power. During the alternate period of the cycle when the windings 16 and 17 are de-energized, the contact 22 disengages the leads 26 and 27 and engages the ground connection. At the same time, the contact 21 disengages the lead 24. The emitter is left unconnected, the collector is biased positively with respect to ground by the battery 32, and the base is connected to ground through one of the resistors 35 through 37. Under these conditions, current will flow from the battery 32 to the collector of the transistor 10 through the base of the transistor and out to ground through the switch 40 and one of the resistors 35 through 37. The current that flows during this period of the cycle is the $I_{co}$.

The resulting output signal produced at terminals 42 and 43 is a square wave voltage. The low part of the square wave corresponds to the period when power is applied to the transistor. During this period, the contact 21 is closed and shunts the terminals 42 and 43. The high part of the square wave corresponds to the period when contact 21 is open and the current flowing through the selected one of the resistors 35 through 37 is the $I_{co}$. The magnitude of the voltage across terminals 42 and 43 during this period will be proportional to the current flowing through the selected resistor so this magnitude will be proportional to the $I_{co}$. The square wave signal voltage at terminals 42 and 43 therefore varies between zero during the low part and a magnitude during the high part proportional to the $I_{co}$ of the unit. The value of the $I_{co}$ is then easily obtained by measuring the amplitude of the square wave signal voltage. It is contemplated that the amplitude be measured by applying the signal to a calibrated oscilloscope. By selecting different ones of the resistors 35–37 the scale of the output signal may be varied.

The circuit thus provides an indication of the junction temperature of a transistor as a function of the input power (calculated as $V_c \times I_c(\text{Ave})$) by alternately applying power to the unit and measuring the $I_{co}$ of the unit for short periods of time. Such information is invaluable for the purpose of determining the maximum power input which can be handled by the unit without exceeding the junction temperature at which permanent damage occurs and from this information assigning a realistic maximum safe power rating to the unit.

This invention has been described for the specific example of testing an n-p-n transistor. The invention is also obviously applicable for testing p-n-p transistors. Such an application would merely require the reversing of the battery polarities. This and other modifications are considered to come within the scope of the invention which is to be limited only as defined in the appended claims.

What is claimed is:

1. An apparatus for testing transistors comprising a first source of D.C. potential, a second source of D.C. potential, an impedance means, a first cyclic switch means to connect said first source of D.C. potential between the collector and emitter of a transistor and to connect said second source of D.C. potential in a series circuit with said impedance means between the emitter and base of said transistor during a first period of a cycle and to connect said first source of D.C. potential in a series circuit with said impedance means between the collector and base of said transistor during a second period of said cycle leaving the emitter of said transistor and said second source of D.C. potential unconnected, a pair of sensing terminals severally connected to the terminals of said impedance means whereby any voltage developed across said impedance means may be measured, and a second cyclic switch means to short out said impedance means during said first period of said cycle.

2. An apparatus for testing transistors as recited in claim 1 wherein said first and second cyclic switch means comprise relays operated from a common source of D.C. pulses.

3. An apparatus for testing transistors comprising a first source of D.C. potential, a second source of D.C. potential, a cyclic switch means to connect said first source of D.C. potential between the collector and emitter of a transistor and to connect said second source of D.C. potential between the base and emitter of said transistor during a first period of a cycle and to connect said first source of D.C. potential between the collector and base of said transistor during a second period of said cycle with the emitter of said transistor unconnected, and means to determine the collector current flow during said second period of said cycle.

4. An apparatus for testing transistors comprising means to alternately cause emitter current to flow in a transistor during a first period of a cycle and to cause collector saturation current to flow in said transistor with no emitter current during a second period of said cycle, an impedance connected to have said collector saturation current flow therethrough, a pair of terminals severally connected to the terminals of said impedance whereby any voltage developed across said impedance may be measured, and means to short out said impedance means during said first period of said cycle.

5. An apparatus for testing transistors comprising means to alternately cause emitter current to flow in a transistor during a first period of a cycle and to cause collector saturation current to flow in said transistor with no emitter current during a second period of said cycle, an impedance means connected to have said collector saturation current flow therethrough during said second period of said cycle and to have no current flow therethrough during said first period of said cycle and sensing means connected to said impedance means whereby any voltage developed across said impedance means may be measured.

6. An apparatus for testing transistors comprising means to alternately cause emitter current to flow in a transistor during a first period of a cycle and to cause collector saturation current to flow in said transistor with no emitter current during a second period of said cycle, and means to produce a square wave the amplitude of which is proportional to the magnitude of said collector saturation current.

7. A method of testing a transistor comprising cyclically repeating the steps of biasing said transistor during a first period so that emitter current flows in said transistor and biasing said transistor during a second period so that collector saturation current flows in said transistor with no emitter current, passing said collector saturation current through an impedance during said second period while measuring the voltage developed across said impedance, and passing no current through said impedance during said first period.

References Cited in the file of this patent

Publication, "Measuring Transistor Temperature Rise," Electronics, April 1954, pp. 185–187.